Feb. 25, 1930. Y. MIYAOKA 1,748,304
WHEEL GUARD
Filed July 31, 1929
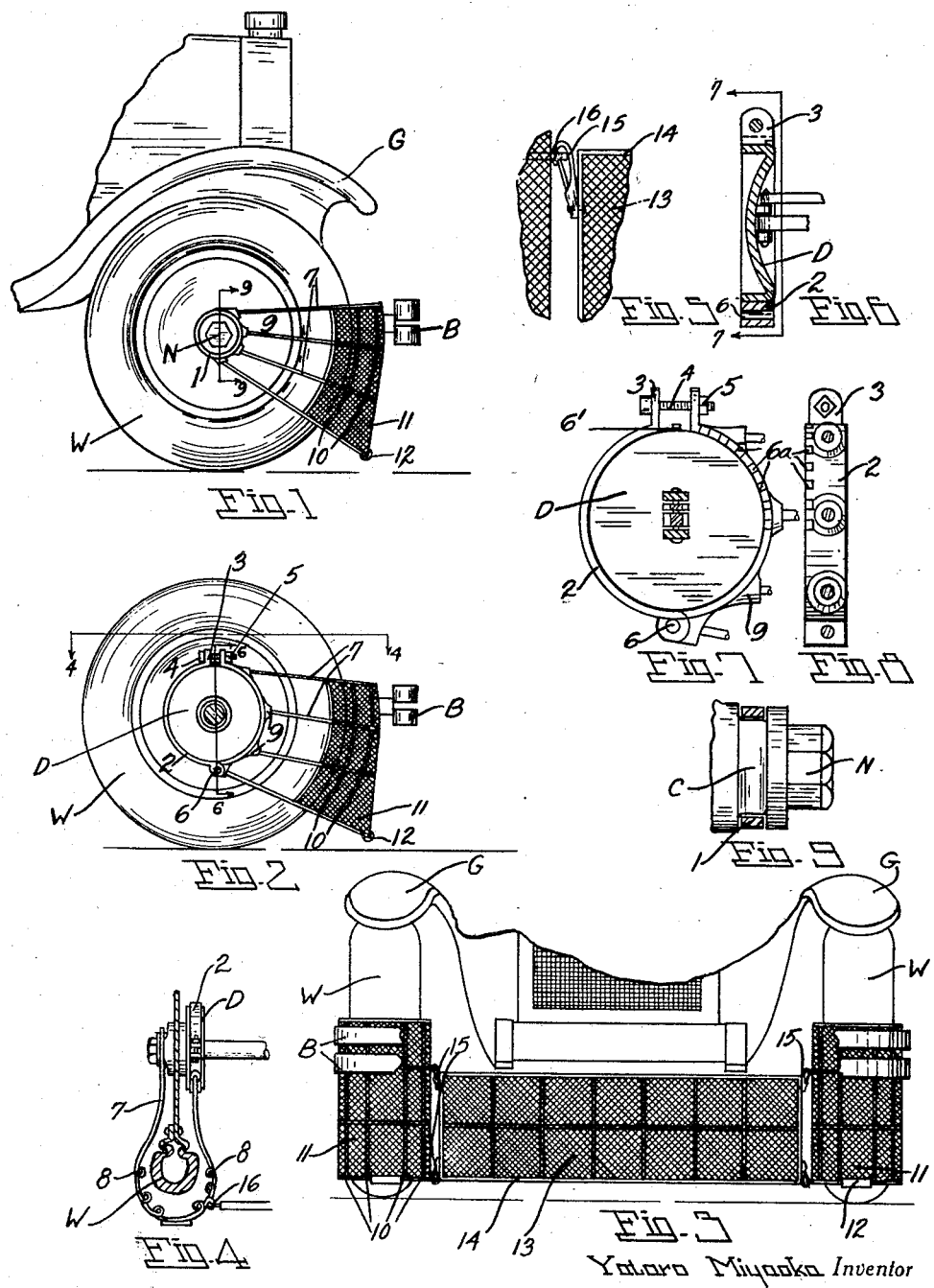
Yutaro Miyaoka Inventor
By Herbert E. Smith
Attorney Patented Feb. 25, 1930

1,748,304

UNITED STATES PATENT OFFICE

YATARO MIYAOKA, OF SPOKANE, WASHINGTON

WHEEL GUARD

Application filed July 31, 1929. Serial No. 382,308.

My present invention relates to improvements in wheel guards especially designed for use with the front wheels of automotive vehicles for the protection of life and limb of pedestrians and others. The guards are used in pairs in front of the front wheels of the vehicle and they perform the functions of fenders or cushions to absorb shocks of contact with persons, or objects in front of the wheel, to reduce the danger of injury in case of collision with a person, and to prevent the wheel from running over the person or object struck by the guard or fender.

The primary object of the invention is the provision of a device of this character which is effective in the performance of its functions; which is simple in construction and comparatively inexpensive in cost of manufacture; which may with facility be attached to the front wheel of an automobile and with equal facility may be removed therefrom when required; and which may readily be adjusted with relation to the supporting wheel to position for properly performing its functions.

The invention consists in certain novel constructions, and combinations and arrangements of parts with the hub-cap of the wheel and with the brake-drum of the wheel, as will hereinafter be more fully set forth and claimed. In the accompanying drawings I have illustrated one complete example of the physical embodiment of my invention wherein the parts are combined and arranged according to one mode I have thus far devised for the practical application of the principles of my invention.

Figure 1 is an exterior side view at the front portion of an automobile or automotive vehicle, showing a wheel equipped with one of the guards. Figure 2 is a view in elevation at the inner side of the left front wheel, showing the front axle in section, and the wheel guard carried by the wheel. Figure 3 is a view in elevation at the front of an automobile showing the guards for the right and left front wheels and the guards are joined by a fender-screen. Figure 4 is a plan view as at line 4—4 of Figure 2. Figure 5 is an enlarged detail view showing the manner of detachably connecting the fender screen with the two wheel guards. Figure 6 is a sectional view at line 6—6 of Figure 2. Figure 7 is a face view at the inner side of one of the brake drums, as at line 7—7 of Figure 6. Figure 8 is an edge view of the device of Figure 7. Figure 9 is a detail view showing the manner of supporting the wheel guard from the hub cap or hub of the wheel.

It will be understood that the guards are used in pairs, one guard for the right front wheel and the other for the left front wheel, and inasmuch as the guards are of complementary construction, the description of one guard will suffice for both guards.

The guards are used at attachments for the wheels, and in adapting the guards for use with the wheels W, I utilize the usual hub cap C and nut N of the wheel, and the brake drum D; the bumper B and the front mud guards G being illustrated in addition to these parts for convenience in understanding the general assembly and relation of parts of the invention.

The front bumper B is supported in usual manner at the front of the vehicle for the performance of its usual functions, and the wheel guards of my invention are associated with the front wheels, at the rear of the ends of the bumper, below the mudguards G, and in front of the lower half of the wheels W.

The guards surround the tire portion of the wheel, and each guard is supported at the outer side of the wheel from the hub cap C and at the inner side of the wheel from the brake drum D, said drum of course being stationary, and thus providing a stationary support for the guard. The hub-cap 6 of course revolves with the wheel, and the guard is loosely arranged in connection with said cap.

Thus, as best seen in Figure 9 a ring or circular band 1 loosely encircles the hub cap, and the nut N is used to retain the ring loosely over the cap so that the latter may revolve within the ring. At the inner side of the wheel the guard is equipped with a split or hinged, clamp ring 2 having perforated flanges 3, and a bolt 4 and nut 5 are used to clamp the ring on the drum D. The clamp ring is hinged at 6 to facilitate its attachment to the brake drum at the inner side of the wheel. In converting the drum for use with the guard, I equip the drum with a lug 6', preferably located at the top of the drum, and as best seen in Figures 7 and 8, the hinged clamp ring is provided with complementary spaced notches 6ª, fashioned in the inner edge of the ring-section. The clamp ring may thus be turned to adjusted position on the drum, with a notch engaging around the lug, and after the bolt 4 and nut 5 have been manipulated to clamp the ring on the brake drum, the co-action of the lug and notch hold the clamp ring and the guard in rigid, adjusted position. The guard may thus be adjusted in front of the wheel with relation to the ground, the lower edge of the guard being raised or lowered as desired, and the guard is adjusted with the wheel journal as a center for its swinging movement during adjustment.

The guard comprises a light, but strong, wire frame supported from the two rings 1 and 2, and the frame comprises a plurality of U-shaped, vertically spaced, and approximately horizontal wires or bows 7, each having a number of eyes 8 fashioned therein and spaced apart as best seen in Figure 4. At their ends, the U-bows are welded, or otherwise rigidly secured to complementary bosses 9 on the rings 1 and 2, and these bosses are fashioned integrally with the front portions of the rings so that the bows may straddle the front portions of the wheels. The guard frames also include a number of vertically arranged, curved brace rods or wires 10 that pass through alined eyes of the U-bows and these braces are welded or otherwise rigidly secured to the bows at the eyes. The guard frames are thus fashioned as skeletons to which wire screens 11 are affixed in suitable manner and the screens are of sufficient area to straddle the front portions of the wheel tires, as indicated in Figures 1 and 2. In these figures of the drawing it will be seen that the guards are elevated above the ground surface, and the lower edges of the guards are provided with rollers, as 12, journaled on the bottom U-bow, so that they will ride over any irregularities that may be encountered in the ground or road surface, and thus protect the guard from shocks. The guard frame is preferably fashioned of resilient wires in order that it may "give" under such conditions, and then immediately return to its normal condition.

In some instances I may use a front screen or fender 13, as best shown in Figure 3, across the front of the vehicle and slightly elevated above the ground level. This screen is preferably of strong wire mesh supported on a well braced rectangular frame 14, and at the ends of the fender-frame are pairs of snap hooks 15 adapted to be snapped into complementary eyes or eye-bolts 16 properly located and affixed at the adjoining inner sides of the guards. The screen-fender may readily be attached to the two guards, and it is suitably supported at its four corners by means of the two guards.

Having thus fully described my invention what I claim as new and desire to secure by Letters Patent is:—

1. The combination in a wheel-guard with a pair of attaching rings, of a plurality of U-bows having their ends secured to the rings and cross braces for said bows.

2. The combination in a wheel guard with a pair of attaching members, of a plurality of U-bows having their ends secured to said members, cross braces for said bows, and a wire-screen secured to the forward parts of said bows.

3. The combination in a wheel-guard, of a pair of attaching rings, one of said rings being openable, and means for clamping said openable ring on a supporting part of the wheel.

4. The combination in a wheel guard, of a pair of attaching rings, one of said rings being hinged and provided with perforated flanges, a bolt and nut for said flanges, and a guard frame supported from said rings.

5. The combination with the wheel hub cap and brake-drum, the latter having a lug thereon, of a ring on the cap, a hinged clamp ring having notches, and means for clamping the clamp ring on the drum, a plurality of U-bows having their ends secured to the rings, cross braces for the bows, and a wire mesh screen fixed on the bows and braces.

In testimony whereof I affix my signature.

YATARO MIYAOKA.